Figure 1:
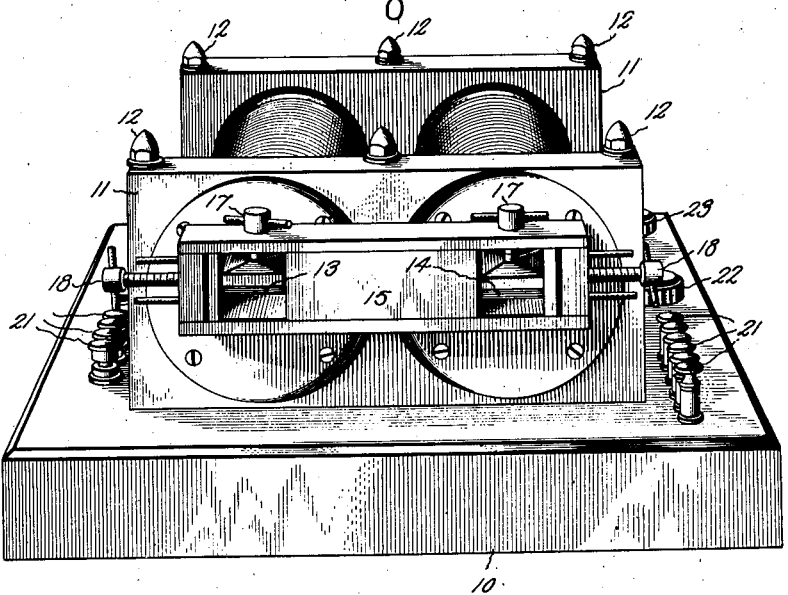

Oct. 27, 1925.

S. L. GOKHALE

PERMEAMETER

Filed Dec. 13, 1923

1,559,085

2 Sheets-Sheet 1

Inventor
Shankar L. Gokhale,
by
His Attorney

Oct. 27, 1925.  
S. L. GOKHALE  
PERMEAMETER  
Filed Dec. 13, 1923

1,559,085

2 Sheets-Sheet 2

Inventor:  
Shankar L. Gokhale,  
by Alexander F. ____  
His Attorney.

Patented Oct. 27, 1925.

1,559,085

UNITED STATES PATENT OFFICE.

SHANKAR L. GOKHALE, OF SCHENECTADY, NEW YORK, ASSIGNOR TO GENERAL ELECTRIC COMPANY, A CORPORATION OF NEW YORK.

PERMEAMETER.

Application filed December 13, 1923. Serial No. 680,526.

*To all whom it may concern:*

Be it known that I, SHANKAR L. GOKHALE, a citizen of the United States, residing at Schenectady, in the county of Schenectady, State of New York, have invented certain new and useful Improvements in Permeameters, of which the following is a specification.

My invention relates to apparatus for and a method of measuring properties of magnetic materials such as the permeability and hysteresis of sheet iron. The objects of my invention are to provide a quick, accurate and easy method of performing such measurements and to simplify and decrease the cost of the necessary apparatus therefor.

The importance of accurate data relating to the permeability and hysteresis of magnetic material used for electrical engineering purposes has for a long time been appreciated and various methods of measurement have been devised. In the ultimate analysis these methods involve two fundamental measurements, namely, the measurement of magnetizing force (H) acting on the magnetic material under test and the measurement of the magnetic flux ($\varphi$) or flux density (B) produced thereby in the material. The measurement of flux or flux density presents no difficulty as the ballistic method of measuring B by means of transient currents induced in a coil wound around the sample is both simple and accurate. However, the measurement of H has presented considerable difficulty as heretofore there has been no method available for its direct measurement.

Various methods for the indirect measurement of H have heretofore been proposed and practiced, but all have been based on certain theoretical considerations and are accurate only when the conditions implied in the theory are fulfilled. These methods thus reduce in practice to the problem of fulfilling the conditions upon which the indirect method depends.

One such indirect method for the measurement of H may be called the ring method and is based on Ampère's law $w = 4\pi NI$ which corresponds to the work done in carrying a unit pole along a magnetic path around an electric circuit. If the path be uniform at all points so as to have the same intensity at all points of the path, the value of the magnetizing force can be determined by the formula $$H = \frac{4\pi NI}{L}$$

where N represents the number of turns, I the current and L the length of the magnetic path. In this method the sample must consist of a closed ring and the method is therefore not practicable for ordinary purposes.

There are various methods for testing straight samples of magnetic material and it is to this class that my invention belongs. As a general rule, most of the methods heretofore devised for testing straight samples have been inaccurate. The most accurate among these methods is the method used by the United States Bureau of Standards and popularly known as the Burrows method. A complete description of the Burrows method may be found in Bulletin No. 117 and Circular No. 17, 1916, published by the Bureau of Standards, Washington, D. C. This method consists of distributing magnetizing turns around the magnetic path in such a way as to produce a very uniform flux density in the sample under test. The value of H is then computed from the ampere turns by the use of the formula $$H = \frac{4\pi NI}{10}$$

where NI represents the magnetizing ampere turns per centimeter length of the test sample.

There are two principal sources of error in the Burrows method which make its use objectionable; namely, the theoretical source of error in the formula $$H = \frac{4\pi NI}{10}$$

and the error in compensation due to the lack of sensitivity and damping of the galvanometer. The first source of error has been recognized by Dr. Burrows, who has given formulæ for its approximate correction (see Bureau of Standards Bulletin No. 117, pages 64 to 66 inclusive). The computation for correction using these formulæ is very laborious and in practice is generally omitted. The second source of error is inherent in the Burrows method. It has been found that the least error in compensation will produce a very considerable error in the result. The task of obtaining exact compensations is very trying on the operator even when equipped with the best of the most sensitive galvanometers. The Burrows method also requires that the magnetizing coils be wound with the utmost care as any error or irregularity in the distribution of the winding is fatal to the accuracy of the test.

The Burrows method has been especially mentioned here because applicant's method is a modification thereof and it was in investigating the sources of error in the Burrows method that the applicant's method wherein these errors are eliminated was discovered. I have discovered that if the magnetizing force is measured by means of a coil placed in close proximity with the sample under test, H may be measured directly while the errors due to imperfections in compensation are eliminated and that accurate tests may be accomplished without laborious computation and with much less auxiliary apparatus than has heretofore been necessary.

Figure 2:
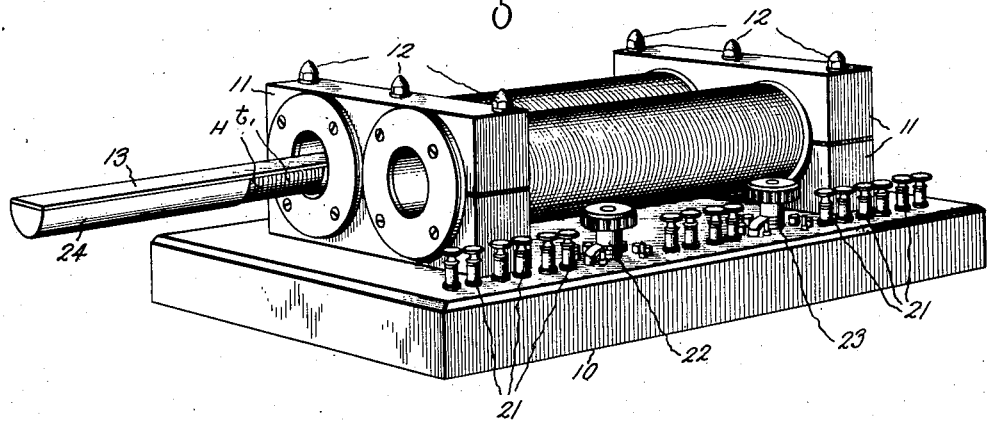
Figure 3:
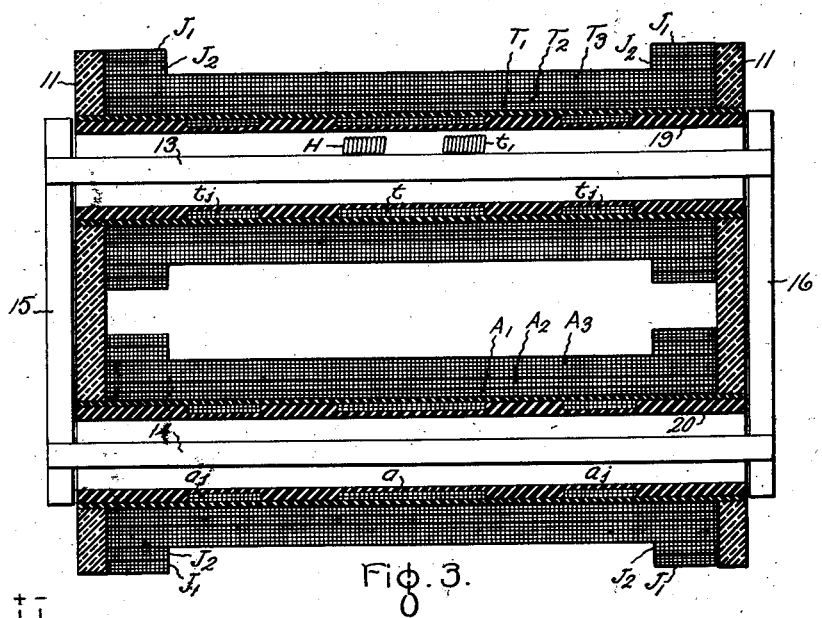
Figures 4, 5:
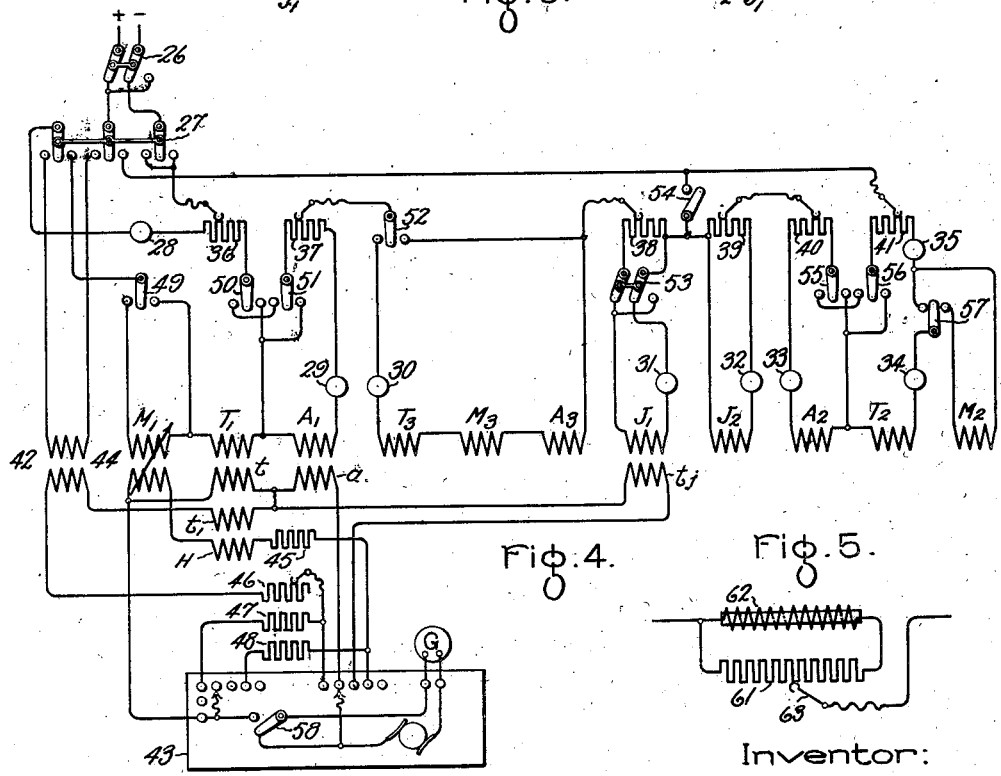

The features of my invention which I believe to be novel and patentable will be pointed out in the claims appended hereto. My invention will now be described in connection with the accompanying drawings in which Figs. 1 and 2 show perspective end and side views respectively of the testing apparatus or permeameter used with my invention; Fig. 3 illustrates a cross section through the testing apparatus for the purpose of showing the general arrangement and relative positions of the windings used; Fig. 4 represents the wiring diagram for the apparatus together with the external galvanometer and adjusting devices; and Fig. 5 an auxiliary adjusting device.

Referring to the drawings wherein like parts are designated by like reference characters throughout, the permeameter is mounted on a suitable base 10, such as slate or wood. A rectangular magnetic circuit is supported on base 10 by means of split blocks 11 made of non-magnetic insulating material secured to the base by means of bolts 12, also made of non-magnetic material, such as brass. The magnetic circuit consists of two straight parallel sections of magnetic material 13 and 14 and end yokes 15 and 16 of magnetic material completing the magnetic circuit. The member 13 is the sample of magnetic material to be tested and the member 14 is a similar sample of magnetic material of approximately the same grade hereinafter referred to as the auxiliary sample. The end yokes are provided with openings through which the magnetic members 13 and 14 are adapted to be inserted, and with adjustable clamps 17 and 18 by means of which the magnetic members 13 and 14 are clamped in place and the circuit made as complete as possible. In Fig. 1 the magnetic circuit is shown as complete with the end yokes in place and in Fig. 2 the end yokes, together with the auxiliary sample, have been removed, while the test sample 13 is shown as being partially removed from the test position.

Between the supporting blocks are provided a pair of spools 19 and 20 (see Fig. 3) made of non-magnetic material such as fibre or hard rubber upon which are wound the various coils to be referred to and through which the two magnetic members 13 and 14 are inserted. The base 10 is also provided with the necessary circuit terminals 21 for connecting the various coils to the external apparatus and with switches 22 and 23 used for controlling purposes.

Referring now more in particular to Figs. 3 and 4, the permeameter is provided with magnetizing coils $T_1$, $T_2$, $T_3$, $A_1$, $A_2$ and $A_3$ uniformly wound about the total length of the spools 19 and 20, the letter T designating those coils wound about the test sample and the letter A designating those coils wound about the auxiliary sample, compensating magnetizing coils $J_1$ and $J_2$ each in four sections and one section of each being wound about the spools 19 and 20 adjacent their ends, potential coils $tj$ and $aj$, each wound in two sections about the spools 19 and 20 respectively, potential coils $t$ and $a$ wound about the central portion of the spools 19 and 20 respectively, and a potential coil H for measuring the magnetizing force and an air compensating coil $t_1$, both placed adjacent the test piece 13 at the center of the spool within the influence of the various magnetizing coils, but not wound around the test piece as are the other coils. Preferably the coils H and $t_1$ are wound on a form 24, such as wood or other non-magnetic material arranged to be inserted in the spool 19 longside the test piece 13, as indicated in Fig. 2. The various coils are connected with suitable binding posts 21 so as to conveniently connect them to the external apparatus with which the permeameter is to be used. The main magnetizing coils for the test sample are in three sections, $T_1$, $T_2$ and $T_3$. Sections $T_1$ and $T_2$ are connected to separate binding posts and section $T_3$ is connected through a dial switch 23 for selecting the desired number of turns, as may be required. The main magnetizing coils for the auxiliary sample, comprising sections $A_1$, $A_2$ and $A_3$, are in all respects similar to the main magnetizing coils for the test sample, the outer layer $A_3$ being connected through the dial switch 22 to vary its number of turns. The purpose of the compensating coils $J_1$ and $J_2$ is to compensate for leakage flux at turning points in the magnetic circuit at the junction of the samples and the yokes and these coils are equally distributed at the four points of the magnetic circuit. The potential coils $a$ and $aj$ are not essential for some of the tests hereinafter referred to, but these coils are desirable to make the instrument adaptable for various purposes and also to make two sides of the instrument interchangeable.

In order to give a practical illustration, but not as a limitation of my invention, the following specifications for the permeameter coils may be used for testing samples having a length of 50 and a width of 3 centimeters. Coils $T_1$, $T_2$, $A_1$ and $A_2$, one layer each of 20.2 turns per inch of length; coils $J_1$ and $J_2$ each wound with double strand of 100 turns per corner, $100 \times 4$ turns for each coil; coils $T_3$ and $A_3$, each of nine layers of 20.2 turns per inch of length. All the T and A coils are designed to give H=10 per ampere for each layer. On account of the larger diameter of the successive coils, the H factor gradually diminishes. For the outermost layer, the H factor is 9.95 gilberts per ampere and for the innermost coil, 9.99 gilberts per ampere, the error being less than 1 per cent. The magnetizing coils are rated at 2½ amperes for five minutes. Coil $t$ has 100 turns. Coil $t_1$ is designed to compensate for the air flux in coil $t$, and matched correctly to give zero deflection at H=200. Coils $tj$ and $aj$ each have 100 turns divided in two equal sections. Coil H is designed to give a deflection of 100 mm. for H=1 and to have an interlinkage factor of .015 megalines per gauss.

The instrument as thus described, is adapted to be used with auxiliary apparatus, and in Fig. 4 I have represented a wiring diagram wherein the various coils of the permeameter are shown connected to the auxiliary apparatus. The wiring diagram shows, in addition to the coils of the permeameter, a reversing switch 26 which connects the entire apparatus to a suitable source of direct current supply. The selector switch 27, which is shown in the open position, is used for the purpose of connecting the apparatus for permeability or hysteresis tests when closed to the right and for calibration of the galvanometer for the measurement of B when closed to the left. Theoretically there should be an ammeter at each point indicated by reference characters 28 to 35 inclusive. Practically it is neither necessary nor convenient to have so many ammeters. Plug sockets for ammeters are therefore provided at these points. An ammeter will be necessary at 28 during permeability tests and at 28 and 34 for hysteresis tests. All ammeter sockets not in use are kept short circuited by convenient plugs. 36 to 41 inclusive are adjustable rheostats which combine with the various coils with which they are in shunt to form the special non-inductive, adjustable shunt described in connection with Fig. 5 and may be termed, self-compensating shunts. 42 is a mutual inductance used for calibrating galvanometer G. 43 is a galvanometer switch box of the usual construction, provided with the necessary terminals and switches to connect the galvanometer to the various potential circuits to be tested. 44 is a variable mutual inductance for neutralizing the flux in the coil H. The primary of this mutual inductance is divided into three sections $M_1$, $M_2$ and $M_3$ which are grouped as shown for the sake of simplicity. These sections operate in relation to the magnetizing coils $T_1$, $T_2$ and $T_3$ with which they are associated in Fig. 4. 45 to 48 inclusive are resistances and 49 to 58 inclusive are switches for making connections for different tests.

Before describing the method of using the apparatus, it will be desirable to refer to Fig. 5 which shows a rheostat especially adapted for adjusting the current of a magnetizing coil or any other circuit having inductance, the reversal of which would otherwise affect the galvanometer differently than its normal operation, due to delay in reversing the magnetic flux on account of the large or variable time constant of the local circuit. This device consists of a resistance 61 and an iron core coil 62 connected in parallel. One circuit terminal is permanently connected to the adjacent ends of the resistance and inductance, while the adjustable arm 63 of the rheostat is arranged to be adjustable along the resistance element 61. It will be evident that when the arm 63 is near the left-hand end of resistance 61, only a small portion of the total current will flow through the coil 62 and when the arm 63 is near the right-hand end, a greater proportion of the current will flow through the coil 62. Now, when the current in the circuit is reversed to produce a galvanometer deflection, the time constant of the circuit will remain unchanged irrespective of the position of the arm 63 since the resistance of the local circuit containing resistance 61 and the coil 62 is constant. The galvanometer deflection will therefore not be affected by any change in the time constant of the local circuit as would be the case if the resistance were merely a variable shunt in parallel with the coil without any compensating resistance in series with the coil to be adjusted. Each coil of the permeameter which is to be adjusted is shunted by a resistance and the two together form a device such as described in Fig. 5. For example, the resistance 37, the left-hand part of which is the shunt, and the magnetizing coil $A_1$, form such a combination.

It will be noticed that by the wiring arrangement shown and described the magnetizing and compensating coils to be simultaneously energized in any particular case, together with the self-compensated shunts of certain of these coils, may be connected in series to the source of supply and the coils not in use cut out of the series circuit without interfering with the remaining coils. Thus, coils $T_3$, $M_3$ and $A_3$ may be cut out or in by switch 52. Similarly, coil $J_1$ may be cut out by opening switch 53 and cut in by closing said switch, the adjustable shunt resistance 38 maintaining the series circuit when the switch 53 is open. The series arrangement of the starting coils is made possible by the use of the various self-compensated shunts and by the fact that exact compensation is unnecessary in most cases. The series arrangement eliminates the gang switch used in the Burrows method, together with comparatively heavy series rheostats and auxiliary sources of supply necessary where the coils are not connected in series.

The permeameter and the associated circuits are designed so as to be used in ways which I will designate. First, the precision method of measurement, and second, the simplified method of measurement. The precision method is made strictly in accordance with the theory underlying this method, while in the simplified method, slight departures from the theoretical conditions are made in the interests of simplicity and speed without appreciable error.

With a permeameter having the specifications previously described and for permeability measurements up to $H=20$ gausses, the procedure for the precision method is as follows:

Before the iron sample to be tested is inserted in the permeameter, the circuit of the coil H is calibrated by adjusting the resistance 36 in series therewith until an exciting current of one ampere flowing in coils $T_1$ and $A_1$ produces a galvanometer deflection of 100 mm., or in other words the H coil circuit is calibrated to produce a deflection of 100 mm. per gauss in the potential coil H. During this step all the coils not mentioned are cut out. By a galvanometer deflection I mean a ballistic deflection caused by a reversing of the magnetizing current inducing a voltage on the specified potential circuit, in this case, the circuit of coil H. The galvanometer deflection is accomplished by the reversing switch 26.

In the next step, switch 49 is closed to the left and coil $M_1$ of the variable mutual inductance 44 is brought into use and the inductor is adjusted until the galvanometer deflection is reduced to zero. After this, the mutual inductor 44 is not disturbed during the remainder of the test.

The next step is to calibrate the circuit containing coils $t$ and $t_1$. This is accomplished by throwing switch 27 to the left, closing the primary circuit of the standard mutual inductor 42 and adjusting resistance 46 until a galvanometer deflection of 10 mm. represents a flux of one kilo-line per square cm. of the sample. This is according to the well known standard method of calibration.

The sample to be tested is then inserted in the permeameter and compensation is obtained by the coils $J_1$, switch 27 being thrown to the right, in accordance with the Burrows method until the necessary uniformity of flux is obtained and the values of B and H are obtained by that method.

Up to this point the theoretical procedure, except for the calibration of the H coil circuit, has been in accordance with the Burrows method. The galvanometer is now switched to the coil H at the galvanometer switch box and a deflection taken which deflection indicates the error in the Burrows method. The value of this deflection added to the computed value of H gives the true value of H. This last step constitutes the precision method according to my invention.

In the simplified method the general procedure is similar to Burows except that some of the details are either omitted or slightly modified. According to my invention it is not necessary to secure exact equality of flux in coils T and A and the two coils are connected in series which gives the approximate equality sufficient for the purpose. Uniformity of flux in T is secured by proper adjustment of current in the J coils just as in the Burrows and the precision methods, but unlike those methods the uniformity of flux is not tested by the comparative measurements with the $t$ and $tj$ circuits. The current in coils J is adjusted until the circuit of coil H and the secondary of the variable mutual inductor coil $M_1$ gives a zero galvanometer deflection with the sample in place. In other words, the error in the Burrows method is corrected before the actual galvanometer measurement for that method is taken. This secures the approximate uniformity of flux necessary for accurate measurement without tedious adjustments. The measurements of B and H are then taken just as in the Burrows method. B is determined directly from the galvanometer deflection and H by the formula $$H = \frac{4\pi NI}{10}.$$

There is no correction to be made for ir this case the error is equal to zero.

For permeability measurements up to $H=200$ gausses, the general test procedure is the same as above except that the magnetizing coils $T_3$, $A_3$ and $M_3$ are also used.

For hysteresis measurements for peak values of H, not exceeding 10 gausses, the magnetizing coils $T_1$, $A_1$, $J_1$ and $M_1$ are used to obtain the peak of the loop. The test procedure is the same as for permeability measurements. To obtain a point on the loop of the hysteresis curve, the circuits containing coils $T_2$, $A_2$, $J_2$ and $M_2$ are used, the direction of current in this circuit being opposed to the first circuit containing coils $T_1$, $A_1$, $J_1$, $M_1$. This cutting in of the second mentioned circuit is done by means of the switch 54 which replaces the complicated gang switch used by Burrows. The procedure for the necessary uniformity of flux is similar to that used in the permeability measurements. For hysteresis measurements for peak values of H from 10 to 200 gausses, the magnetizing circuit containing coils $T_1$, $A_1$, $J_1$, $M_1$, $T_3$, $A_3$, $M_3$ is used, and the circuit containing coils $T_2$, $A_2$, $J_2$ and $M_2$ only is used to obtain a point on the hysteresis loop, for small negative values of H. In other respects, the procedure is the same as for permeability measurements.

If the permeameter has any irregularity in the distribution of the windings, or there exists any error in compensation, it will be evident that the measurement of H in accordance with the Burrows method, will be incorrect. It has been found by repeated tests under various conditions that the direct measurement of H by my method, that is to say, by the use of a coil in proximity with the sample to be tested, gives substantially accurate results, even though there exists small irregularities in the winding and small errors in compensation and that these results were substantially constant for various small degrees of error in compensation both over and under compensation. This is due to the fact that the flux in the proximate space where the H coil is situated is much more nearly a correct measure of the magnetizing force in the sample if any irregularities in compensation exist, and is a true measure of the magnetizing force if no irregularities or compensating errors exist.

It follows from what has been said and from actual demonstration, that my method with exact or nearly exact compensation, surpasses the Burrows method in accuracy, speed and simplicity and that my method with exact compensation is the most accurate method thus far known for determining the H factor. My approximate method is nearly as accurate as my precision method and requires about one-fourth the time necessary for tests by the Burrows method.

Another important advantage of my method is that it enables less expensive and complicated apparatus to be used. The scheme of wiring described uses, instead of parallel circuits, a single series circuit with self-compensated shunts to control the current in the various magnetizing coils and thus eliminates the gang switch of the Burrows method, reduces the size and weight of the control apparatus and requires less electrical energy.

In accordance with the provisions of the patent statutes, I have described the principle of operation of my invention, together with the apparatus which I now consider to represent the best embodiment thereof, but I desire to have it understood that the apparatus shown and described is only illustrative and that the invention may be carried out by other means.

What I claim as new and desire to secure by Letters Patent of the United States, is:—

1. The method of determining the magnetizing force factor in the testing of magnetic material which consists in producing a substantially uniform magnetizing flux in and around the sample to be tested, computing the magnetizing force on the sample from the formula $$H=\frac{4\pi NI}{10},$$

obtaining a correction factor by comparing the flux in the proximate space to a flux corresponding to the true computed value and algebraically adding said correction factor to the computed value of H.

2. The method of determining the magnetizing force factor in the testing of magnetic material which consists in producing a magnetic flux in and around the sample to be tested, adjusting for uniformity of flux in and around the sample to be tested until the measurement of flux in the proximate space is equal to the measurement of flux in said space with the sample removed and then computing the magnetizing force from the formula $$H=\frac{4\pi NI}{10}.$$

3. A permeameter comprising a substantially closed magnetic circuit, a portion of which comprises a removable sample of magnetic material to be tested, magnetizing and compensating coils enclosing said circuit for producing a substantially uniform magnetic flux therein, a potential coil enclosing said sample and a pair of potential coils enclosed by said other coils situated in close proximity to but not enclosing said sample.

4. A permeameter comprising a rectangular magnetic circuit formed by a pair of samples joined at their ends by magnetic yokes, a plurality of magnetizing coils uniformly wound about said samples, a plurality of compensating coils wound about said samples adjacent their ends, a plurality of test coils wound about one of said samples intermediate its end and a pair of test coils situated closely adjacent said last mentioned sample near its central portion within the influence of said magnetizing coils, but not threaded by said sample.

5. Apparatus for testing magnetic material comprising a permeameter having a plurality of magnetizing and compensating coils, a plurality of test coils associated with said permeameter, a galvanometer, means for connecting the galvanometer to any one of said test coils, a source of direct current supply, means for connecting said magnetizing and compensating coils in series to said source of supply, adjustable resistances in shunt to some of said magnetizing and compensating coils, and means for cutting some of said magnetizing coils out of said series circuit.

6. In combination, a permeameter, a plurality of exciting coils on said permeameter, a plurality of test coils on said permeameter, means for connecting said exciting coils to an external circuit, a galvanometer associated with said test coils, means for interrupting or reversing said circuit to produce a galvanometer deflection and adjustable resistances connected in shunt to certain of said exciting coils whereby the time constant of said circuit remains unchanged irrespective of the value of the exciting current 7. In an apparatus for testing magnetic materials, an iron core exciting winding, a test coil influenced by change of flux in said core, a galvanometer associated with said test coil for detecting changes in the flux of said core and an adjustable resistance connected in shunt to said exciting winding, said resistance and exciting coil forming an inductively compensated shunt by means of which the exciting current may be changed without affecting the time constant of the exciting circuit.

8. Apparatus for testing magnetic materials comprising a permeameter having a substantially closed magnetic circuit a portion of which comprises the sample to be tested, means for producing a substantially uniform flux in and about said sample, and means for detecting when said flux is substantially uniform, comprising a test coil wound about said sample, a test coil closely adjacent to, but not threaded by said sample, a galvanometer arranged to be connected with either of said test coils and a variable mutual inductor adapted to be connected in series with said second mentioned test coil to balance the effect thereof on the galvanometer when said flux is substantially uniform.

In witness whereof, I have hereunto set my hand this 12 day of December, 1923.

SHANKAR L. GOKHALE.